United States Patent [19]

Bredt

[11] Patent Number: 5,059,161
[45] Date of Patent: Oct. 22, 1991

[54] ROTATIONAL CONTROL APPARATUS

[75] Inventor: Robert C. Bredt, Minneapolis, Minn.

[73] Assignee: Horton Industries, Inc., Minneapolis, Minn.

[21] Appl. No.: 473,874

[22] Filed: Feb. 2, 1990

[51] Int. Cl.$^5$ .............................................. F16H 57/10
[52] U.S. Cl. ................................ 475/269; 192/48.91; 192/85 A; 474/74
[58] Field of Search ................. 192/48.9, 48.91, 85 A, 192/87.1, 87.14, 87.15, 70.2, 70.28, 18 A, 87.11; 474/73, 74, 76; 475/269

[56] References Cited

U.S. PATENT DOCUMENTS

| | | | |
|---|---|---|---|
| 2,881,597 | 4/1959 | Jacobs | 62/133 |
| 2,885,896 | 5/1959 | Hungerford | 474/74 X |
| 3,017,977 | 1/1962 | Becker et al. | 474/74 X |
| 3,037,602 | 6/1962 | Clements | 192/48.91 X |
| 3,203,279 | 8/1965 | Rahrig et al. | 474/73 |
| 3,253,687 | 5/1966 | Young | 192/85 |
| 3,295,394 | 1/1967 | Whateley | 475/142 |
| 3,382,736 | 5/1968 | Abbott | 475/142 |
| 3,409,305 | 11/1968 | Nieland | 277/40 |
| 3,429,192 | 2/1969 | Allen | 474/73 X |
| 3,444,748 | 5/1969 | Sutarak | 474/74 X |
| 3,468,402 | 9/1969 | Edwards | 192/18 A |
| 3,675,747 | 7/1972 | Obermark | 192/48.91 X |
| 3,762,517 | 10/1973 | Hanks | 192/18 A |
| 4,226,095 | 10/1980 | Loken | 64/27 CT |
| 4,482,038 | 11/1984 | Mason | 192/48.91 X |
| 4,613,318 | 9/1986 | McWilliam et al. | 474/74 |
| 4,657,126 | 4/1987 | Hanks et al. | 192/48.91 |
| 4,877,117 | 10/1989 | Kniebel et al. | 192/85 A |

FOREIGN PATENT DOCUMENTS

| | | | |
|---|---|---|---|
| 54-112446 | 9/1979 | Japan | 474/73 |
| 57-51046 | 3/1982 | Japan | 474/74 |

Primary Examiner—Dwight Diehl
Attorney, Agent, or Firm—Peterson, Wicks, Nemer & Kamrath

[57] ABSTRACT

Rotational control apparatus in the form of fan clutches (C) are disclosed including a first, friction disc portion (12) splined on a hub (20) and rotatably mounted on a shaft (24). The friction disc portion (12) is reciprocal between a first position rotatably related to the facing (52) of a sheave (50) rotatably mounted on the hub (20) and a second position rotatably independent of the sheave (50). A second friction disc portion (212) is splined on the hub (20) and is reciprocal between a first position rotatably related to the facing (252) of a second sheave (250) rotatably mounted on the hub (20) and rotating at a different rotational speed than sheave (50). By selective engagement of the friction disc portions (12, 212), the hub (20) will be rotated on the shaft (24) at either the rotational speed of the first sheave (50) or the second sheave (250). In another form, a second, friction disc portion (112) is rotatably mounted on a reciprocal piston (100) and rotatable relative to the hub (20). Planetary gears (114) are rotated intermediate and in gearing relation between a sun gear (96) fixed on the shaft (24) and an annulus (124) fixed to the hub (20). The second, friction disc portion (112) is reciprocal between a first position rotatably related to a facing (152) secured to the sheave (50) opposite to the facing (52). By selective engagement of the friction disc portions (12, 112), the hub (20) will be rotated on the shaft (24) at either the rotational speed of the sheave (50) or at a rotational speed different than the sheave (50) and specifically at a rotational speed dependent on the ratio of the planetary drive.

18 Claims, 2 Drawing Sheets

ROTATIONAL CONTROL APPARATUS

BACKGROUND

The present invention generally relates to rotational control apparatus, relates particularly to clutches, and relates specifically to fan clutches.

Although fan clutches of the type shown in U.S. Pat. Nos. 3,253,687; 3,409,305; 3,762,517; 4,226,095; and 4,877,117 have proven to provide precise power, exceptional economy and dependable, long-lived durability, there exists a need to provide improvements to result in a further advantageous clutch. Specifically, a need exists to provide maximum engine cooling at both maximum engine torque and at maximum engine horsepower. Depending upon the particular design of the engine, maximum engine torque occurs typically at about 1200 RPM engine speed while maximum engine horsepower occurs typically at about 2100 RPM engine speed. To provide maximum engine cooling at both maximum engine torque and at maximum engine horsepower, the radiator cooling fan must run at a speed providing maximum air flow, typically at the speed of maximum engine horsepower, at both maximum engine torque and at maximum engine horsepower engine speeds. As the fan is often driven through a belt drive from the engine crank shaft and is typically selected to provide maximum air flow at the speed of maximum engine horsepower, a problem exists to also obtain maximum cooling at maximum engine torque speed which is considerably less than maximum engine horsepower speed.

SUMMARY

The present invention solves these needs in the field of rotational control apparatus by providing, in the most preferred form of a fan clutch, speed up drive devices allowing the output of the rotational control apparatus, a fan in the most preferred form, to be operated at sped up ratios from the input of the rotational control apparatus, a belt drive connected to the engine crank shaft in the most preferred form.

In a first aspect of the present invention, rotational control apparatus is provided including first and second inputs rotatably mounted on a hub in turn rotatably mounted on a shaft and including first and second, friction disc portions slideably mounted on and rotationally related to the hub and reciprocated between first positions to rotatably relate the inputs to the friction disc portions and second positions rotatably independent from the inputs, with the inputs rotating at different rotational speeds to drive the hub at different rotational speeds.

In another aspect of the present invention, rotational control apparatus is provided including an input rotatably mounted on a hub in turn rotatably mounted on a shaft and including first and second, friction disc portions reciprocated between first positions to rotatably relate an input to the friction disc portions and second positions rotatably independent from the input, with the first, friction disc portion being slideably mounted on and rotationally related to the hub and the second, friction disc portion being rotatably related to the hub at a drive ratio other than direct.

It is thus an object of the present invention to provide a novel rotational control apparatus.

It is further an object of the present invention to provide such a novel rotational control apparatus in the form of a fan clutch.

It is further an object of the present invention to provide such a novel rotational control apparatus having ease of serviceability.

It is further an object of the present invention to provide such a novel rotational control apparatus which includes a speed up drive.

It is further an object of the present invention to provide such a novel rotational control apparatus having reduced noise.

It is further an object of the present invention to provide such a novel rotational control apparatus having reduced squeal.

It is further an object of the present invention to provide such a novel fan clutch providing maximum engine cooling at both maximum engine torque and at maximum engine horsepower.

It is further an object of the present invention to provide such a novel rotational control apparatus having an improved friction disc where the center of the overall mass is moved radially inwardly.

It is further an object of the present invention to provide such a novel rotational control apparatus having an improved friction disc of increased rigidity with less overall mass.

It is further an object of the present invention to provide such a novel rotational control apparatus having a double tapering friction disc.

It is further an object of the present invention to provide such a novel rotational control apparatus designed to be simple.

It is further an object of the present invention to provide such a novel rotational control apparatus which is reliable.

These and further objects and advantages of the present invention will become clearer in light of the following detailed description of illustrative embodiments of this invention described in connection with the drawings.

DESCRIPTION OF THE DRAWINGS

The embodiments may best be described by reference to the accompanying drawings where.

Figure 1:
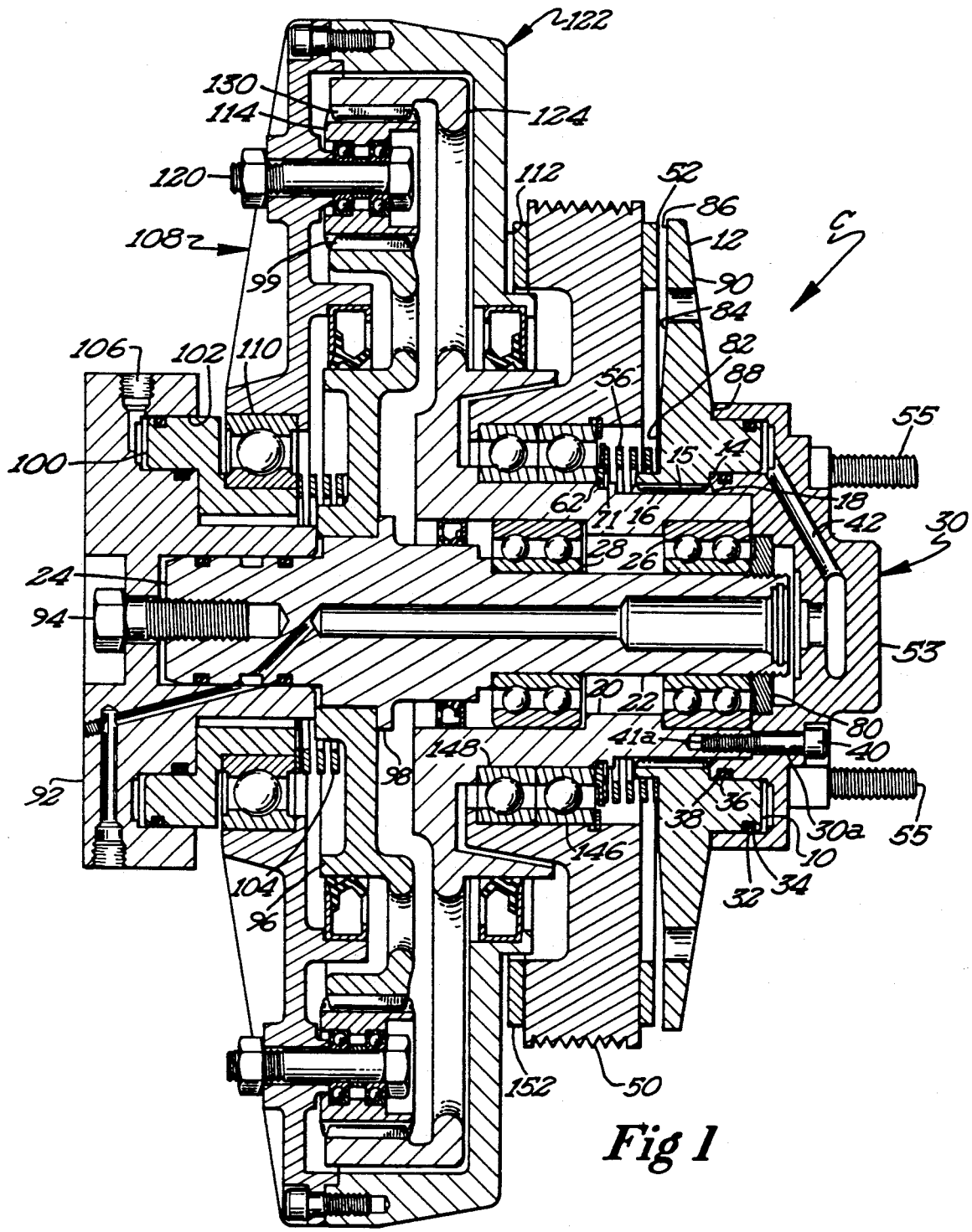
FIG. 1 shows a cross-sectional view of a rotational control apparatus in a first, preferred form of a fan clutch according to the teachings of the present invention.

The figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the figures of the drawings, the same numerals designate the same or similar parts. Furthermore, when the terms "first", "second", "internal", "radial", "axial", "inward", "outward", and similar terms are used herein, it should be understood that these terms have reference only to the structure shown in the drawings as it would appear to a person viewing the drawings and are utilized only to facilitate describing the invention.

DESCRIPTION

Rotational control apparatus according to the preferred teachings of the present invention is shown in the drawings in the preferred form of a fan clutch and is generally designated C. In the most preferred embodiments of the present invention, clutch C is an improvement of the type shown and described in U.S. Pat. Nos. 4,226,095 and 4,877,117. For purpose of explanation of the basic teachings of the present invention, the same numerals designate the same or similar parts in the present figures and the figures of U.S. Pat. Nos. 4,226,095 and 4,877,117. The description of the common numerals and clutch C may be found herein and in U.S. Pat. Nos. 4,226,095 and 4,877,117, which are hereby incorporated herein by reference.

Referring to the drawings in detail, clutch C includes a first member to be driven in the form of an annular piston 10 which has formed thereon the annular friction disc portion 12 and the internal annular base portion 14. Formed internally of the axial hole 15 of the annular base portion 14 are the torque transmitting surfaces in the form of internal splines 16 which engage with the external torque transmitting surfaces in the form of splines 18 of the hub 20. Thus, friction disc portion 12 is slideably mounted on and rotationally related to hub 20 by splines 16 and 18. The hub 20 is rotatably mounted on the reduced outward end 22 of stationary shaft 24 by means of the bearings 26 and 28.

The numeral 30 designates an annular cylinder block in which is slideably mounted the annular piston 10 with sealing engagement by means of the 0-ring 32 mounted in the annular groove 34 formed in the piston and the 0-ring 36 mounted in the annular groove 38 formed in the cylinder 30. The cylinder 30 is secured and rotationally related to the hub 20 by means of a multiplicity of spaced bolts 40 which extend through clearance holes 30a in the cylinder block 30 and engage threaded holes 41a in hub 20. Air pressure is introduced through shaft 24 and into cylinder 30 by conventional conduit means 42.

Mounted on the hub 20 are the bearings 146 and 148 which rotatably mount an input in the form of the sheave 50. The numeral 62 designates a washer received on hub 20 and held on hub 20 by a locking ring 71 received in a circumferential groove formed in hub 20. Bearings 146 and 148 are sandwiched between a shoulder formed on hub 20 and washer 62 and ring 71. Further provided is the compression coil spring 56 sandwiched between washer 62 and piston 10. Friction facing ring 52 is mounted on the side of sheave 50 adjacent friction disc portion 12. The facing 52 is engaged by the friction disc portion 12 of the piston 10 when air pressure is introduced into cylinder 30 thereby clutching in and rotatably relating the friction disc portion 12, the hub 20 and the cylinder block 30 on which a fan (not shown) may be mounted on the pilot extension 53 and secured by means of nut-equipped studs 55 on the cylinder block 30. With facing 52 engaging friction disc portion 12, hub 20, cylinder block 30 and the fan mounted thereon will rotate at the same speed or in other words a 1:1 ratio with respect to sheave 50.

As in the construction shown in U.S. Pat. No. 4,877,117 and since the inner diameter of splines 16 of piston 10 is larger than the axial end of hub 20, piston 10 may be slid over hub 20 without obstruction. Therefore, clutch C according to the teachings of the present invention does not require removal of bearing nut 80 as piston 10 may be simply slid off hub 20 without removing hub 20. Thus, it is not necessary to reinstall bearing nut 80, and problems encountered in field repair or maintenance arising from improper installation of bearing nut 80 are avoided when removing cylinder block 30 and piston 10.

Friction disc portion 12 in clutch C having a single interface according to the teachings of the present invention is further of an advantageous design. Specifically, friction disc portion 12 reduces vibration and minimizes squeal problems by adding overall mass and rigidity by adding mass adjacent base portion 14 and reducing mass at the outer diameter thereof utilizing a double tapering configuration.

Specifically, friction disc portion 12 is of solid construction. The facing engagement side of friction disc portion 12 includes a first, generally radially straight circumferential portion 82 which extends radially to a second, radially angled circumferential portion 84 which extends at a small angle in the range of 4° axially rearwardly to a third, generally radially straight, flat, circumferential portion 86. Portions 82 and 84 intersect at a radial extent generally equal to the radial surface of piston 10 including groove 34. Portions 84 and 86 intersect at a radial extent generally equal to the inner diameter of facing 52. Thus, when assembled, portion 86 is generally parallel to facing 52. Further, the side of friction disc portion 12 opposite facing 52 includes a first, generally radially straight circumferential portion 88 which extends radially to a second, radially angled circumferential portion 90 which extends at a small angle larger than the angle of portion 84 and in the preferred form in the range of 9° 29′ axially inwardly to the peripheral edge of friction disc portion 12. Portions 88 and 90 intersect at a radial extent slightly larger than the intersection of portions 82 and 84 and in the most preferred form at a radial extent generally equal to the radial extent of annular cylinder block 30. Further, the side of friction disc portion 12 opposite facing 52 is free of air cooling fins as sufficient cooling is provided by the fan blades when clutch C is utilized as a fan clutch in its most preferred form.

In a first preferred form of the present invention, clutch C is shown in FIG. 1 including a planetary gear, speed up drive for hub 20, cylinder block 30, and the fan mounted thereto. Specifically, an independent, removable, flange bracket 92 is secured to shaft 24 by a screw 94 and includes a cylindrical portion slideably received on the axial end of shaft 24 and includes an annular flange extending radially from shaft 24. A stationary sun gear 96 is rotatably fixed to shaft 24 such as by press fitting the bore of the hub of gear 96 on shaft 24 and axially capturing it between a shoulder 98 formed on shaft 24 and bracket 92. Gear 96 includes axially extending gear teeth 99 formed on its outer periphery.

Clutch C further includes an annular piston 100 which is reciprocally received in a cylinder cavity 102 formed in the radial flange of bracket 92. Piston 100 is biased into cavity 102 by a spring 104 sandwiched between gear 96 and piston 100. Piston 100 is moved in cavity 102 against the bias of spring 104 by fluid pressure introduced through inlet 106 formed in bracket 92.

The axial bore of the radially extending, generally circular central portion of a bowl shaped, annular, planetary cage 108 is rotatably mounted on and axially related to piston 100 by a bearing 110. At spaced, circumferentially spaced locations around the circular central portion of cage 108, planetary gears 114 are rotatably mounted to cage 108 such as by bolts 120. For example, three gears 114 may be provided spaced 120° from each other. Gears 114 are in direct gearing relation with gear teeth 99 of gear 96. An axially extending flange of a bowl shaped, annular housing 122 is attached to an axially extending shoulder of the outer periphery of cage 108 and extends to a generally flat, circular portion located on the opposite side of gears 114 than cage 108. The circular portion of housing 122 includes a friction disc portion 112. A friction facing ring 152 is mounted on the opposite side of sheave 50 than ring 52 and adjacent friction disc portion 112. The facing 152 is engaged by the friction disc portion 112 when air pressure is introduced into cavity 102 through inlet 106 thereby clutching in and rotatably relating friction disc portion 112, housing 122, cage 108, and gears 114 carried thereby.

Clutch C further includes an annulus 124 including an axially extending flange portion having axially extending, internal gear teeth 130 in direct gearing relation to planetary gears 114 opposite to sun gear 96. Annulus 124 is rotatably fixed to and in the preferred form integral with the axially inner end of hub 20 by a generally flat, circular portion extending between and integral with the axial end of hub 20 and the axially extending flange of annulus 124. In the most preferred form, gears 114 and teeth 99 and 130 are located in an oil bath. For example, the components may be configured and oil seals may be provided between an annular cavity formed in gear 96 and a flange extending axially from cage 108, between hub 20 and shaft 24, and between the radially inner end of housing 122 and a flange extending axially from the generally flat, circular portion of annulus 124 as shown in FIG. 1. Apertures may be formed in gear 96 and annulus 124 for weight reduction.

It can then be appreciated that when friction disc portion 112, housing 122, cage 108, and gears 114 are clutched in and rotatably related to sheave 50, planetary gears 114 will rotate and gear with gear 96. As gear 96 is stationary in the most preferred form, gears 114 will then gear upon and drive annulus 124. As hub 20 is fixed to annulus 124, hub 20 and cylinder block 30 secured thereto by bolts 40 and on which a fan (not shown) may be mounted will rotate. Due to the planetary gear drive of clutch C of FIG. 1, block 30 and the fan mounted thereon will rotate at a speed different than sheave 50 according to the particular gear teeth utilized in the planetary drive. For example, in the preferred form, the planetary gear ratio is an increasing ratio of 1.75:1. Further, the fan may be selected to provide maximum air flow when the engine is running at the speed at which maximum horsepower occurs, such as at 2100 RPM. Thus, when the engine speed is at the speed at which maximum horsepower occurs, friction disc portion 12 is clutched in and rotatably related with friction facing 52 of sheave 50 such that the fan will be directly driven at the engine speed in the same manner as with clutches C of U.S. Pat. Nos. 4,226,095 and 4,877,117 while friction disc portion 112 is rotatably independent from facing 152 of sheave 50. However, when the engine is running at the speed at which maximum torque occurs, for example which may occur at 1200 RPM, friction disc portion 112 is clutched in and rotatably related with friction disc 152 of sheave 50 such that the fan will be driven at a faster speed than the engine speed, which in the present example would be at 2100 RPM to also obtain maximum air flow for the fan while friction disc portion 12 is rotatably independent from facing 52 of sheave 50. Thus, by the selective engagement of friction disc portions 12 and 112 with facings 52 and 152, the fan can be driven by clutch C of FIG. 1 to provide maximum air flow at both maximum engine horsepower and at maximum engine torque.

Figure 2:
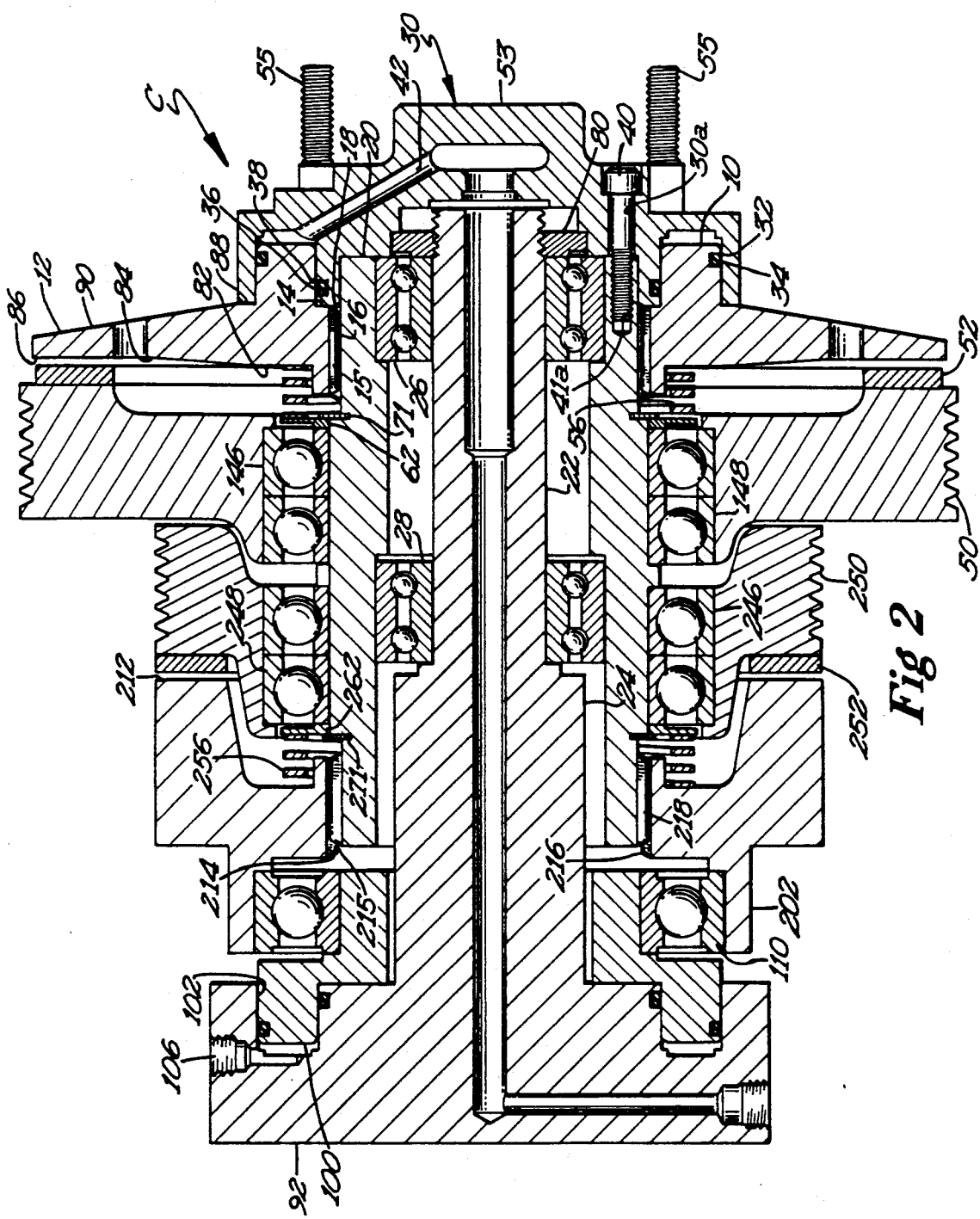
FIG. 2 shows a cross-sectional view of a rotational control apparatus in a second, preferred form of a fan clutch according to the teachings of the present invention.

In a further, preferred form of the present invention, clutch C is shown in FIG. 2 including a dual pulley, speed up drive for hub 20, cylinder block 30, and the fan mounted thereto. Specifically, a second input or sheave 250 is rotatably mounted to hub 20 by bearings 246 and 248, with the diameter of sheave 250 being smaller than sheave 50 such that sheave 250 rotates at a rotational speed different than sheave 50. A flange 202 extending axially from an annular friction disc portion 212 is rotatably mounted and axially related to piston 100 by bearing 110. Thus, friction disc portion 212 is rotatable relative to shaft 24 and to hub 20. Annular friction disc portion 212 also includes an internal annular base portion 214. Formed internally of the axial hole 215 of the annular base portion 214 are the the torque transmitting surfaces in the form of internal splines 216 which engage with the external torque transmitting surfaces in the form of splines 218 of hub 20. Thus, friction disc portion 212 is slideably mounted on and rotationally related to hub 20 by splines 216 and 218.

The numeral 262 designates a washer received on hub 20 and held on hub 20 by locking ring 271 received in a circumferential groove formed in hub 20. Bearings 246 and 248 are sandwiched between a shoulder formed on hub 20 and washer 262 and ring 271. Further provided is the compression coil spring 256 sandwiched between washer 262 and base portion 214 of friction disc portion 212. Friction facing ring 252 is mounted on the side of sheave 250 opposite sheave 50 and adjacent friction disc portion 212. The facing 252 is engaged by friction disc portion 212 when air pressure is introduced into cavity 102 thereby clutching in and rotatably relating the friction disc portion 212, hub 20, and cylinder block 30 on which the fan may be mounted. With facing 52 being rotatably independent from friction disc portion 12 and with facing 252 engaging friction disc portion 212, hub 20, cylinder block 30 and the fan mounted thereon will rotate at a faster speed than sheave 50 due to the reduced diameter of sheave 250, which in the preferred form has a speed up ratio of 1.75:1. For example, the fan is again assumed to be selected to provide maximum air flow when the engine is running at the speed at which maximum horsepower occurs, such as at 2100 RPM. Thus, when the engine speed is at the speed which maximum horsepower occurs and with friction disc portion 212 being rotatably independent from facing 252 of sheave 250, friction disc portion 12 is clutched in and rotatably related with friction disc 52 of sheave 50 such that the fan will be directly driven at the engine speed in the same manner as with clutches C of U.S. Pat. Nos. 4,226,095 and 4,877,117. However, when the engine is running at the speed at which maximum torque occurs, for example which may occur at 1200 RPM and friction disc portion 12 is rotationally independent from facing 52 of sheave 50, friction disc portion 212 may be clutched in and rotatably related with friction disc 252 of sheave 250 such that the fan will be driven at a faster speed than the engine speed, which in the present example would be at 2100 RPM to also obtain maximum air flow for the fan. Thus, by the selective engagement of friction disc portions 12 and 212 with facing 52 and 252, the fan can be driven by clutch C of FIG. 2 to provide maximum air flow at both maximum engine horsepower and at maximum engine torque.

Now that the basic teachings of the present invention have been explained, many extensions and variations will be obvious to one having ordinary skill in the art. For example, although clutch C is shown in the most preferred forms including the speed up drive systems, it can be appreciated that speed reduction systems may be provided.

Likewise, although clutch C has been shown in the most preferred form as including several unique features which are believed to synergistically relate together, it can be appreciated that such feature's may be used independently and/or in combination with other features according to the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. In a rotational control apparatus including a first, friction disc portion slideably mounted on and rotationally related to a hub rotatably mounted on a shaft and including a first input rotatable relative to the hub and to the shaft at a first rotational speed, with the first, friction disc portion being reciprocal on the hub between a first position to rotatably relate the first, friction disc portion to the first input to drive the hub at the first rotational speed and a second position with the first, friction disc portion being rotatably independent from the first input, the improvement comprising means for rotating the hub on the shaft at a second speed different from the first rotational speed when the first, friction disc portion is in the second position.

2. The rotational control apparatus of claim 1 wherein the input is rotatably mounted on the hub.

3. The rotational control apparatus of claim 2 wherein the rotating means comprises, in combination: a second input rotatably mounted on the hub, with the second input having a second rotational speed different than the first rotational speed of the first input; a second, friction disc portion slideably mounted on and rotationally related to the hub, with the second, friction disc portion being reciprocal on the hub between a first position to rotatably relate the second, friction disc portion to the second input to drive the hub at the second, rotational speed and a second position with the second, friction disc portion being rotatably independent from the second input.

4. The rotational control apparatus of claim 3 wherein the first and second inputs are first and second sheaves having different drive diameters.

5. The rotational control apparatus of claim 4 wherein the first, friction disc portion includes a first, annular piston; wherein the rotational control apparatus further comprises, in combination: an annular cylinder block for receiving the first, annular piston, with the annular cylinder block being removably attached to the hub; means for biasing the first annular piston into the cylinder block; a second, annular piston; an annular cavity formed in a flange extending radially from the shaft, with the annular cavity being concentric to the shaft and for receiving the second, annular piston; means for rotatably mounting and axially relating the second, annular piston to the second, friction disc portion; and means for biasing the second, annular piston into the annular cavity.

6. The rotational control apparatus of claim 5 wherein the annular cylinder block includes means for mounting a fan, with the rotational control apparatus acting as a fan clutch.

7. The rotational control apparatus of claim 3 wherein the second, friction disc portion is slideably mounted on the hub independently of the first, friction disc portion.

8. The rotational control apparatus of claim 2 wherein the rotating means comprises, in combination: a second, friction disc portion rotatable relative to the hub, with the second, friction disc portion being reciprocal relative to the hub between a first position to rotatably relate the second, friction disc portion to the first input to drive the second, friction disc portion at the first rotational speed and a second position with the second, friction disc portion being rotatably independent from the first input; and means for rotatably relating the second, friction disc portion to the hub at a drive ratio other than direct.

9. The rotational control apparatus of claim 8 wherein the rotatably relating means comprises a planetary gear drive.

10. The rotational control apparatus of claim 9 wherein the planetary gear drive comprises, in combination: a sun gear rotatably fixed to the shaft; an annulus rotatably fixed to the hub and including an internal gear; and at least one planetary gear rotatably mounted to the second, friction disc portion and in directing gearing relation with and intermediate the sun gear and the internal gear.

11. The rotational control apparatus of claim 10 wherein the first, friction disc portion includes a first, annular piston; wherein the rotational control apparatus further comprises, in combination: an annular cylinder block for receiving the first, annular piston, with the annular cylinder block being removably attached to the hub; means for biasing the first annular piston into the cylinder block; a second, annular piston; an annular cavity formed in a flange extending radially from the shaft, with the annular cavity being concentric to the shaft and for receiving the second, annular piston; means for rotatably mounting and axially relating the second, annular piston to the second, friction disc portion; and means for biasing the second, annular piston into the annular cavity.

12. The rotational control apparatus of claim 11 wherein the annular cylinder block includes means for mounting a fan, with the rotational control apparatus acting as a fan clutch.

13. The rotational control apparatus of 11 wherein the flange is formed independent from the shaft, with the flange being removably secured to the shaft, and wherein the sun gear is received on the shaft and axially captured between a shoulder formed on the shaft and the flange.

14. Rotational control apparatus comprising, in combination: a first, friction disc portion slideably mounted on and rotationally related to a hub, with the first, friction disc portion including a first, annular piston; a first input rotatable relative to the hub at a first rotational speed, with the first, friction disc portion being reciprocal on the hub between a first position to rotatably relate the first, friction disc portion to the first input to drive the hub at the first rotational speed and a second position with the first, friction disc portion being rotatably independent from the first input; a second input rotatable relative to the hub, with the second input having a second rotational speed different than the first rotational speed of the first input; a second, friction disc portion slideably mounted on and rotationally related to the hub, with the second, friction disc portion being reciprocal on the hub between a first position to rotatably relate the second, friction disc portion to the second input to drive the hub at the second, rotational speed and a second position with the second, friction disc portion being rotatably independent from the second input; an annular cylinder block for receiving the first, annular piston, with the annular cylinder block being removably attached to the hub; means for biasing the first annular piston into the cylinder block; a second, annular piston; an annular cavity for receiving the second, annular piston; means for rotatably mounting and axially relating the second, annular piston to the second, friction disc portion; and means for biasing the second, annular piston into the annular cavity.

15. The rotational control apparatus of claim 14 wherein the annular cylinder block includes means for mounting a fan, with the rotational control apparatus acting as a fan clutch.

16. The rotational control apparatus of claim 14 wherein the first and second inputs are rotatably mounted on the hub.

17. The rotational control apparatus of claim 16 wherein the first and second inputs are first and second sheaves having different drive diameters.

18. The rotational control apparatus of claim 14 wherein the hub is rotatably mounted on a shaft, with the annular cavity being formed in a flange extending radially from the shaft and being concentric to the shaft.

* * * * *